(12) United States Patent
Bormann

(10) Patent No.: US 6,625,707 B2
(45) Date of Patent: Sep. 23, 2003

(54) SPECULATIVE MEMORY COMMAND PREPARATION FOR LOW LATENCY

(75) Inventor: David S. Bormann, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 183 days.

(21) Appl. No.: 09/891,853

(22) Filed: Jun. 25, 2001

(65) Prior Publication Data

US 2002/0199062 A1 Dec. 26, 2002

(51) Int. Cl.[7] .............................. G06F 12/08
(52) U.S. Cl. .................. 711/169; 711/140; 711/167; 711/168

(58) Field of Search ................... 711/140, 167, 711/168, 169

(56) References Cited

U.S. PATENT DOCUMENTS 3,896,419 A * 7/1975 Lange et al. ............... 711/129
6,226,722 B1 * 5/2001 Shippy et al. .............. 711/168

* cited by examiner

Primary Examiner—Kevin L. Ellis
Assistant Examiner—Midys Inoa
(74) Attorney, Agent, or Firm—Blakely, Sokoloff, Taylor & Zafman LLP

(57) ABSTRACT

Speculative memory commands are prepared for reduced latency. A system memory read request is sent for preparing a main memory read command and for performing a cache lookup. The main memory read command is prepared independent from the performance of the cache lookup.

17 Claims, 7 Drawing Sheets

SPECULATIVE MEMORY COMMAND PREPARATION FOR LOW LATENCY

FIELD OF THE INVENTION

The field of the invention relates to preparation of main memory read commands and more particularly to speculative read command preparation.

BACKGROUND OF THE INVENTION

Low access latency is key to good microprocessor performance. The memory hierarchy of cache and dynamic random access memory (DRAM) is useful to help hide the relatively long latency of main memory. However, if the information sought by the microprocessor is not present in one of the caches, the microprocessor may stall while waiting for the request to return from the DRAM.

In a state of the art computer system, having both a first and second level cache as well as a main memory, an information request from the microprocessor is typically handled in the following manner. If a level one cache lookup fails, then a request is sent to a level two cache controller. A level two cache lookup is then performed. If the level two cache lookup fails then the request is finally sent to the main memory controller, which then forwards the request to main memory. Under this scenario, the potential for a main memory stall is great.

An alternate prior art approach has been to send a memory request to the main memory in parallel to the sending of a cache lookup request. The main memory is searched concurrently to the performance of the cache lookup. Although this approach can reduce latency, it has major drawbacks. Most significantly, it prevents other agents from accessing main memory and consumes bus bandwidth. In the event that the cache lookup is successful, then the energy and time spent to search main memory is wasted.

There is, therefore, a need for reducing main memory latency without generating many wasted memory transactions by preparing a speculative main memory read command.

DETAILED DESCRIPTION

Speculative memory command preparation is described. In the following description, for purposes of explanation, numerous specific details are set forth in order to provide a thorough understanding of the invention. However, it will be apparent to one with ordinary skill in the art that these specific details need not be used to practice the present invention. In other instances, well-known structures and devices are shown in block diagram form in order to avoid unnecessarily obscuring the present invention.

Speculative memory commands are prepared for reduced latency. A system memory read request is sent for preparing a main memory read command and for performing a cache lookup. The main memory read command is prepared independent from the performance of the cache lookup. Main memory latency should be reduced as much as possible to give the best performance from a given microprocessor. Memory latency may be minimized by speculatively preparing a main memory read command while performing one or more cache lookups. Such a modification may provide a substantial boost to microprocessor performance with the addition of very few transistors. Further, this performance boost could be traded off for reduced power consumption in a mobile system. When the memory controller is integrated into the microprocessor and runs at higher clock speeds, speculative main memory read command preparation can further boost performance. Latency may be reduced by as much as 75% as compared to a discrete memory controller hub (MCH) with a 100 MHz front side bus (FSB). Various memory architectures may be used including, but not limited to, synchronous dynamic random access memory (SDRAM), and double data rate SDRAM (DDRSDRAM), RDRAM™ (Rambusυ DRAM). Rambus™ and RDRAM™ are registered trademarks of Rambus Inc.

A "system memory read request" is the information request sent from the microprocessor to the memory hierarchy. A "main memory read command" is a formatted request sent to the main memory for information, issuing from a system memory read request. The terms "memory command" and "memory read command" will be used interchangeably with the term main memory read command. The "address translator/decoder" prepares main memory read commands to be sent to the main memory. The address translator/decoder may be located within or coupled to a main memory controller. The "memory hierarchy" includes the various levels of cache and the main memory. Cache and main memory are also collectively referred to as "storage mechanisms."

Figure 1:
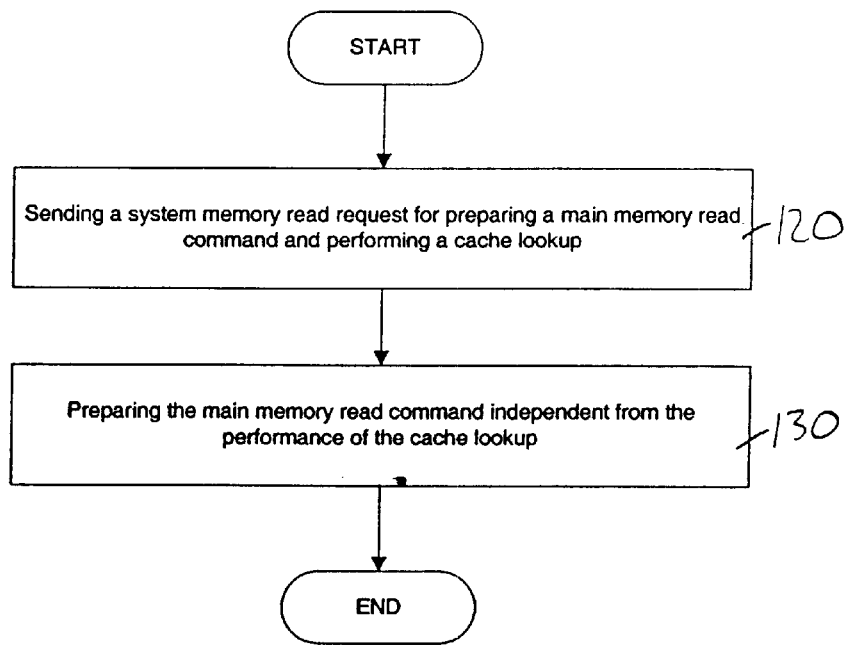
FIG. 1 is a flow diagram of one embodiment of the preparation of a speculative main memory read command.

FIG. 1 is a flow diagram of one embodiment of the preparation of a speculative memory read command. At block 120, a system memory read request is sent for preparing a main memory read command and for performing a cache lookup. At block 130, the main memory read command is prepared independent from the performance of the cache lookup. In one embodiment, if the cache contains the requested information, the main memory read command is never submitted. If the request misses the cache, however, the request can be immediately sent to the main memory to minimize latency as much as possible, without incurring the potential penalty of speculation, i.e. wasted memory transactions. To prevent the speculative memory command activity from adversely affecting the performance of other devices in the system the delivery of the command can be delayed until it is determined that the requested data is not in the cache. In an alternate embodiment, if latency is extremely critical, the main memory read command could be sent to the main memory before the cache responds, canceling the speculative load later if the cache hits. In yet another embodiment, the main memory read command is prepared before a cache lookup miss is reported.

Figure 2:
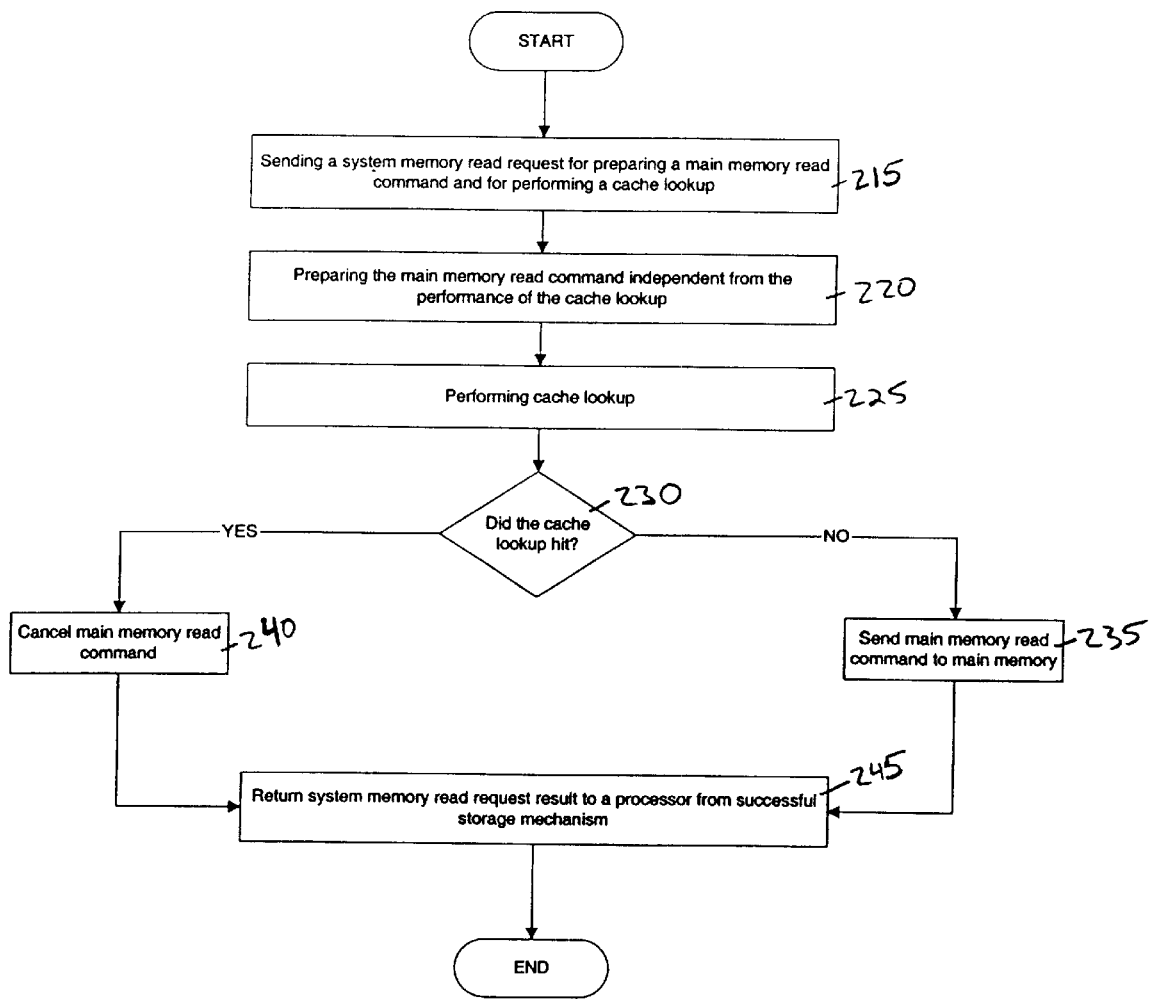
FIG. 2 is a flow diagram of one embodiment of executing a system memory read request according to the present invention.

FIG. 2 is a flow diagram of one embodiment of executing a system memory read request according to the present invention. At block 215, a system memory read request is sent for preparing a main memory read command and for performing a cache lookup. At block 220, the main memory read command is prepared independent from the performance of the cache lookup. At block 225, a cache lookup is performed. At block 230, a determination is made of whether the cache lookup was successful. At block 235, if the higher level cache lookup was not successful, then the main memory read command is sent to the main memory. At block 240, if the higher level cache lookup was successful, then the main memory read command is cancelled. At block 245, a system memory read request result is returned to a processor from a successful storage mechanism. The successful storage mechanism is a storage mechanism in which the information sought by the processor is discovered. In one embodiment, the system waits to arbitrate for main memory access until a cache lookup miss is detected. In another embodiment, the system arbitrates for main memory access whenever the main memory read command is available. Arbitration is the competition between devices in a system for access to a resource.

Figure 3:
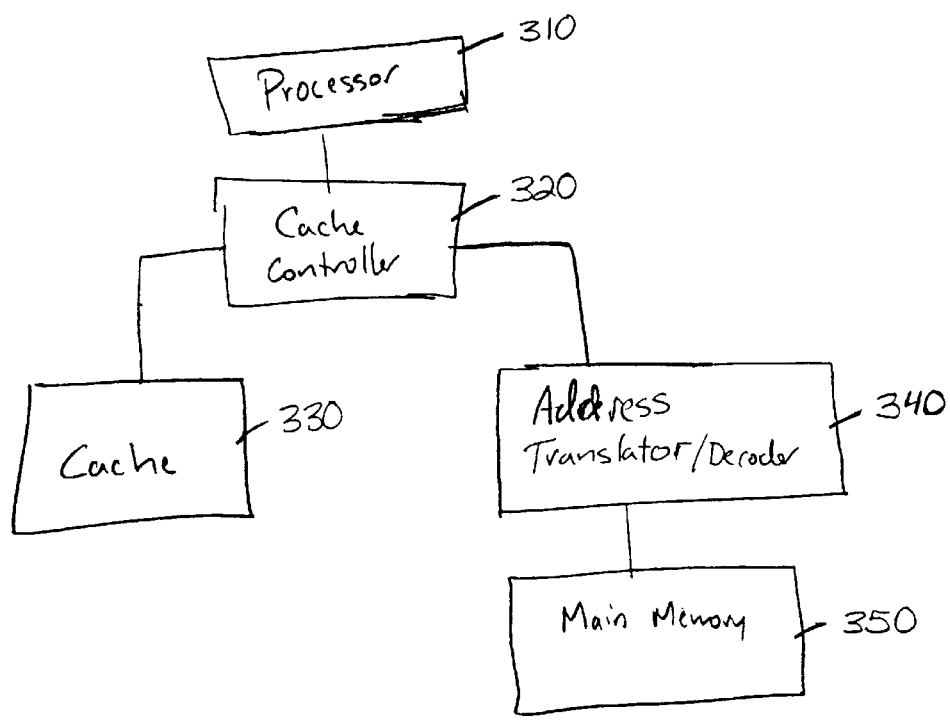
FIG. 3 is a block diagram of one embodiment of a speculative main memory read command system.

FIG. 3 is a block diagram of one embodiment of a speculative memory command system. Processor 310 emits a system memory read request. Cache controller 320 receives the system memory read request from processor 310 and transmits the system memory read request to address translator/decoder 340 and cache 330. Cache 330 performs a cache lookup based upon the system memory request. Address translator/decoder 340 prepares a main memory read command independent from the performance of the current cache 330 lookup. In one embodiment, the cache 330 cancels the main memory read command if the cache 330 lookup hits. Cache 330 can instruct the address translator/decoder 340 to send the main memory read command to main memory 350 if the cache 330 lookup misses. In one embodiment, the successful storage mechanism returns a system memory read request result to the processor 310. In one embodiment, a main memory controller receives the main memory read command from address translator/decoder 340 and forwards it to main memory 350. In another embodiment, the address translator/decoder 340 is a component of a main memory controller, the main memory controller being coupled to the main memory 350.

The address translator/decoder 340 can send the main memory read command to main memory 350 upon notification of a cache 330 lookup miss. The memory read command can be cancelled if the cache 330 lookup hits. In an alternate embodiment, the address translator/decoder 340 sends the main memory read command to a main memory 350 before the cache 330 lookup is completed. In yet another embodiment, the main memory read command is prepared by address translator/decoder 340 before a miss is reported from cache 330.

Figure 4:
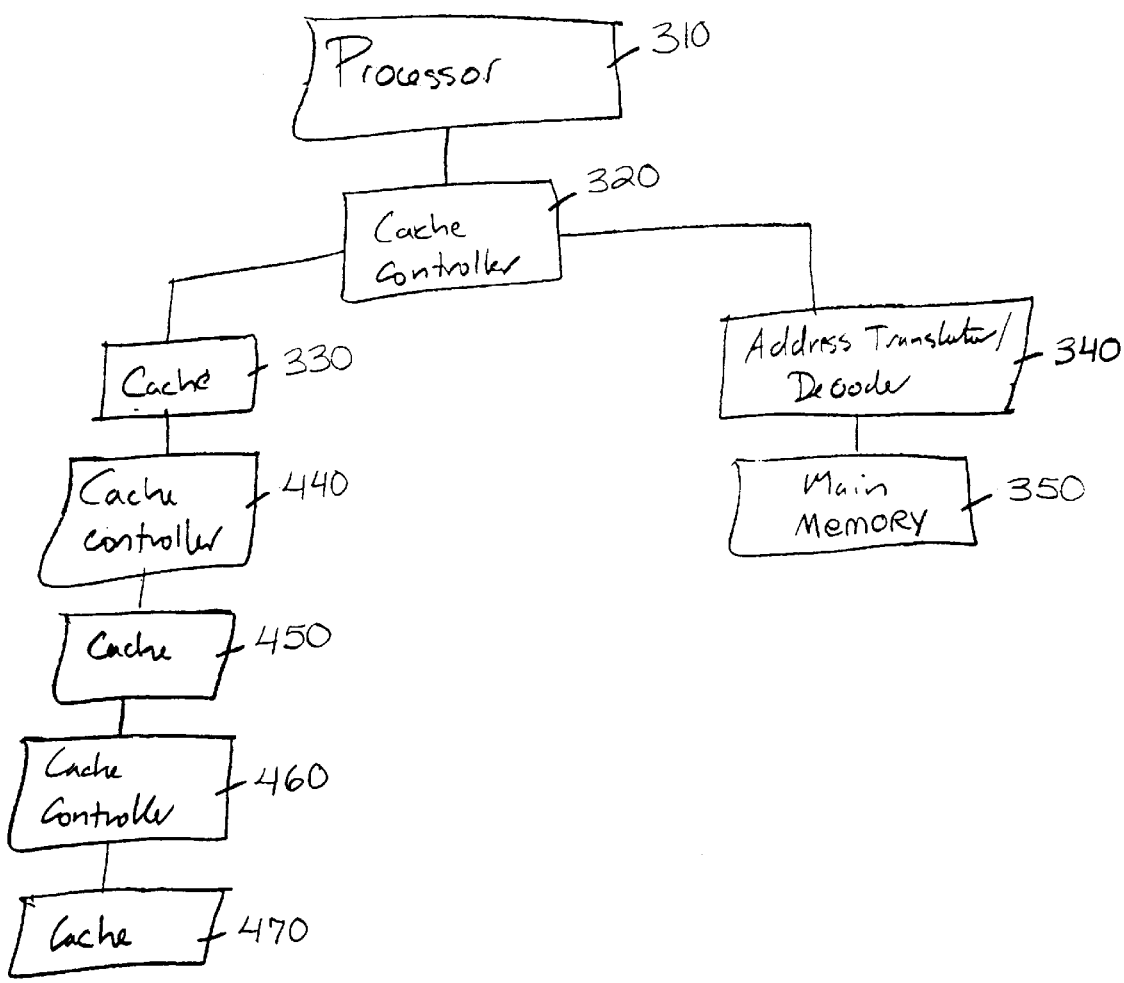
FIG. 4 is a block diagram of an alternate embodiment of a speculative main memory read command system.

FIG. 4 is a block diagram of an alternate embodiment of a speculative memory command system. In FIGS. 3, 4, 5, 6, and 7, blocks with the same numbers indicate objects having similar functions. For example, cache controller 320 has substantially similar functionality in FIGS. 3,4,5,6 and 7. It will be appreciated by one of ordinary skill in the art that any type of cache controller may be used. However, for case of presentation and understanding, the cache controller 320 as described in FIG. 3 is also portrayed in FIGS. 4, 5, 6 and 7. Each cache 330, 450, 470 has its own respective cache controller 320, 440, 460. In one embodiment, when system memory read request is sent to address translator/decoder 340, it is also sent to cache 330. If the cache 330 lookup fails, then the request is sent to cache controller 440 controller. Cache controller 440 sends the request for lookup to cache 450. If cache 450 lookup is unsuccessful, the request is sent to cache controller 460 which then sends the request to cache 470. During the cache lookups, address translator/decoder 340 prepares the main memory read command.

In an alternate embodiment, cache controller 320 sends the system memory read request to the address translator/decoder 340 and all caches 330, 450, 470 in real time. In one embodiment, the first storage mechanism in which the desired information is found sends a response to processor 310. In another embodiment, the caches perform cache lookups and cancel the main memory read command at an earliest cache lookup hit.

The address translator/decoder 340 can send the main memory read command to a main memory 350 upon notification that all of the cache lookups have been completed and are unsuccessful.

Figure 5:
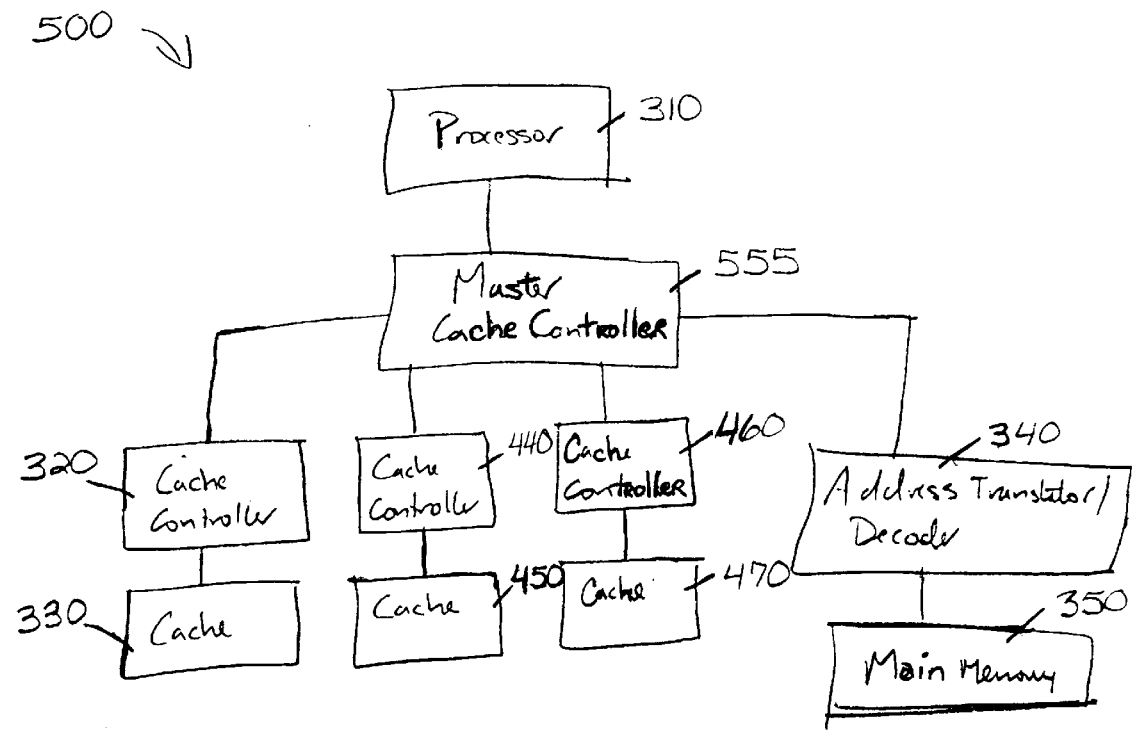
FIG. 5 is a block diagram of an alternate embodiment of the system in FIG. 4.

FIG. 5 is a block diagram of an alternate embodiment of the system in FIG. 4. Cache controllers 320, 440, and 460 control access to caches 330, 450, and 470 respectively. Master cache controller 555 determines whether a next higher level cache is present in the system after a current level cache lookup has been performed. If a next higher level is present, a current level cache sends the system memory read request to a cache controller of the next higher level cache causing the next higher level cache to become the current level cache. The new current level cache then performs a cache lookup.

For example, in a system of at least one level of cache, wherein the cache level being looked up is current level cache, cache 330, a current level cache controller, cache controller 320, receives a system memory read request from processor 310 and master cache controller 555. Current level cache controller 320 sends the request to current level cache 330. Current level cache 330 performs a cache lookup based upon the system memory request. Meanwhile, address translator/decoder 340 prepares a main memory read command independent from the current level cache lookup. If the current level cache 330 lookup is unsuccessful, master cache controller 555 determines if a next higher level cache 450 is present in the system. Since higher level cache 450 is present, the current level cache 330 sends the system memory read request to cache controller 440. This causes cache 450 to become the current level cache. Cache 450 then performs a cache lookup. A similar operation could be performed with cache 470.

Figure 6:
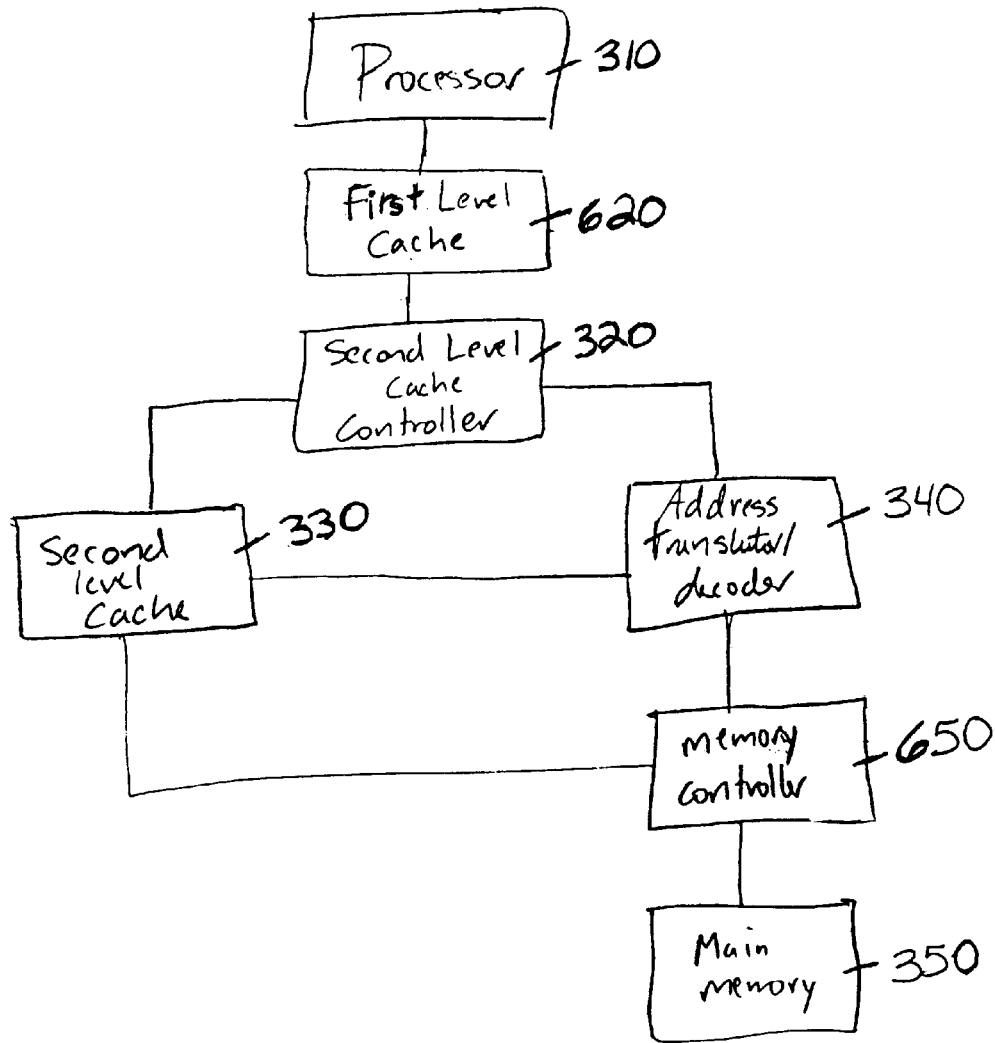
FIG. 6 is a block diagram of yet another embodiment of a speculative main memory read command system.

FIG. 6 is a block diagram of yet another embodiment of a speculative memory command system. First level cache 620 receives a system memory read request from processor 310 and performs a first level cache lookup. If first level cache 620 lookup fails, then second level cache controller 320 receives the system memory read request and sends the system memory read request to second level cache 640 and address translator/decoder 340. Address translator/decoder 340 prepares a main memory read command independent of second level cache 330 activity. Second level cache 330 performs a second level cache lookup. In one embodiment, address translator/decoder 340 sends a main memory read command to the main memory 350 after a second level cache 330 lookup miss. In another embodiment, a successful storage mechanism returns a system memory read request result to the processor 310. The address translator/decoder 340 and second level cache 330 may be coupled to memory controller 650. Memory controller 650 communicates with translator/decoder 340 and second level cache 330 and sends main memory read commands to the main memory 350.

Figure 7:
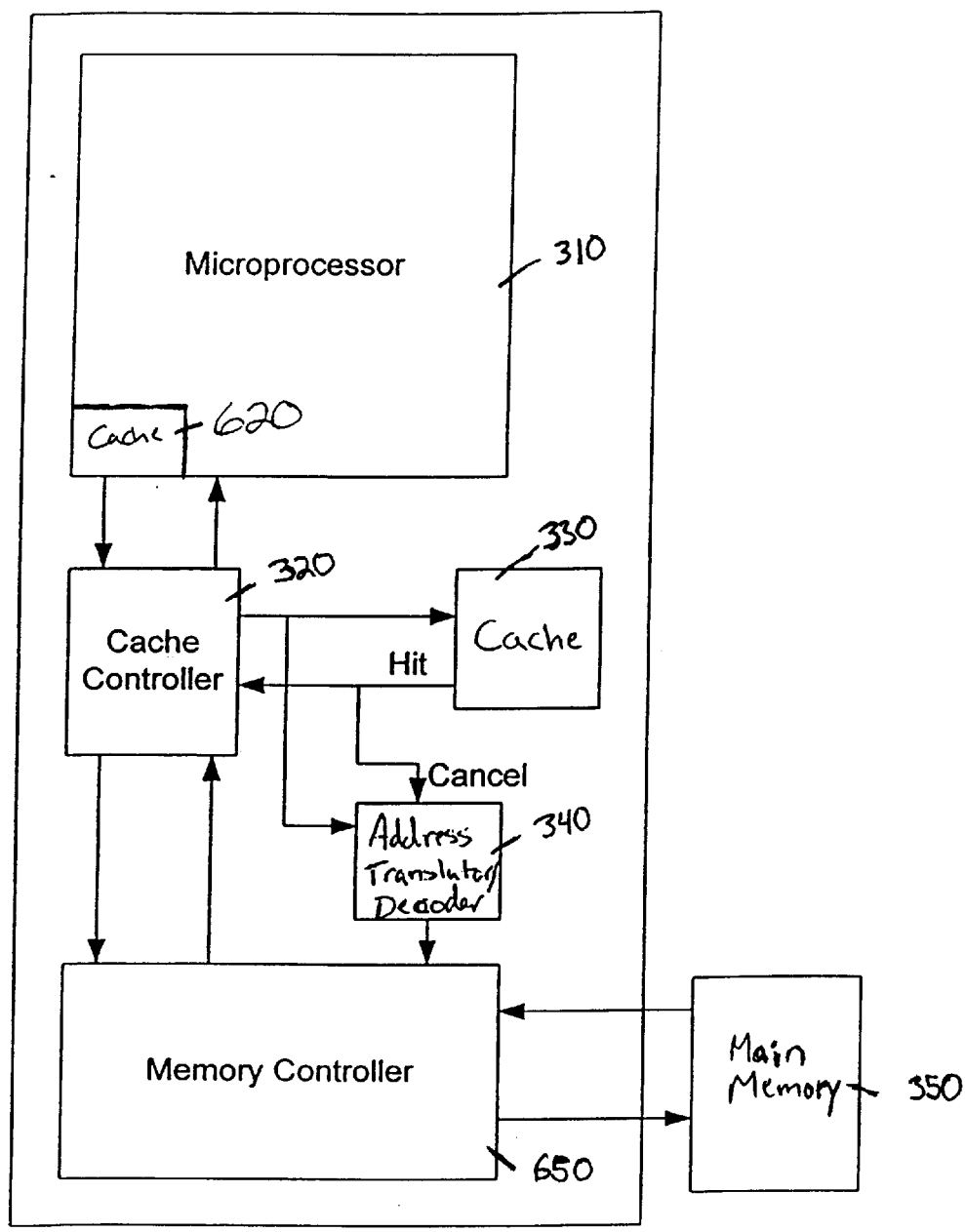
FIG. 7 is a block diagram of still another embodiment of a speculative main memory read command system.

FIG. 7 is a block diagram of still another embodiment of a speculative main memory command system. The memory controller 650 may be integrated with the micro processor 310. Additionally, a lowest level cache 620 may be located within the micro processor 310. In one embodiment, cache 330 and cache controller 320 are incorporated onto a single chip.

In one embodiment, the speculative memory command preparation process, including sending, can encompass the performance of different operations. One or more of the operations listed below may be performed together. For example, in one embodiment, the preparation includes: generating a front-side bus request (system memory read request), arbitrating for front-side bus use, and transmitting the system memory read request onto the front-side bus. The preparation may also include: decoding the front-side bus cycle, determining if the address from the system memory read request is contained in physical memory, as opposed to, for example, a peripheral component interconnect (PCI) device, and checking the global write buffer (GWB) for outstanding writes. The GWB is a small cache that holds memory commands temporarily. If a read arrives for a location with an outstanding write, the write command must be processed first, and then the read performed after the write completes.

In another embodiment, the preparation can include: arbitrating for main memory access, decoding to find memory bank, row and column using the supplied memory address, and, initiating the memory command by sending it to the main memory.

In an alternate embodiment, the method and apparatus are embodied in a computer programmable medium containing executable computer program instructions which, when executed by a data processing system, caused the data processing system to perform a method comprising a series of method steps as discussed above.

In another alternate embodiment, the computer system also comprises a controller means for sending a system memory read request, an address translator/decoder means for preparing a memory read command, independent of cache means activity, and at least one cache means for performing a cache lookup. The system may also include a canceling means for canceling the main memory read command if the cache lookup is successful and a sending means for sending the main memory read command to a main memory if the cache lookup is not successful. Further, the system may comprise a returning means for returning a system memory read request result to a processor from a successful storage mechanism.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   sending a system memory read request for preparing a main memory read command and for performing a cache lookup of a first cache; and
   preparing a main memory read command independent of the performing of the cache lookup of the first cache, wherein the preparing is done before a miss resulting from the cache lookup of the first cache is reported;
   in response to the cache lookup of the first cache being a miss, performing a cache lookup of a second cache, of a higher level than the first cache;
   returning a system memory read request result to a processor from a successful storage mechanism; and
   canceling the system memory read request to a storage mechanism after information sought by the system memory read request is located on the successful storage mechanism.

2. The method of claim 1, further comprising:
   canceling the main memory read command if the cache lookup of the first cache hits;
   sending the main memory read command to a main memory if the cache lookup misses.

3. The method of claim 1, further comprising not arbitrating for main memory access until a cache lookup miss is reported.

4. The method of claim 1, further comprising arbitrating for main memory access whenever the main memory read command is available.

5. The method of claim 1, wherein the sending further comprises operations selected from the group consisting of:
   generating a front-side bus request using the system memory read request;
   arbitrating for use of the front-side bus; and
   transmitting the system memory read request onto the front-side bus.

6. The method of claim 1, wherein the preparing further comprises operations selected from the group consisting of:
   decoding a front-side bus cycle;
   determining if an address from the system memory read request is contained in a physical memory using the results of the decoding of the front-side bus cycle;
   arbitrating for access to a main memory for the main memory read command;
   decoding the system memory read request to determine a memory location; and
   initiating the main memory read command by sending it to the main memory using the results of the decoding of the system memory read request.

7. A computer programmable medium containing executable computer program instructions which, when executed by a data processing system, cause the data processing system to perform a method comprising:
   sending a system memory read request for preparing a main memory read command and for performing a cache lookup of a first cache; and
   preparing a main memory read command independent of the performing of the cache lookup of the first cache, wherein the preparing is done before a miss resulting from the cache lookup of the first cache is reported;
   in response to the cache lookup of the first cache being a miss, performing a cache lookup of a second cache, of a higher level than the first cache;
   returning a system memory read request result to a processor from a successful storage mechanism; and
   canceling the system memory read request to a storage mechanism after information sought by the system memory read request is located on the successful storage mechanism.

8. The computer programmable medium of claim 7, wherein the executable computer program instructions further comprise:
   performing the cache lookup in the first cache;
   sending the main memory read command to a main memory; and
   returning a system memory request result to a processor from a successful storage mechanism.

9. An apparatus comprising:

a controller to receive a system memory read request from a processor and to transmit the system memory read request to a first cache and an address translator/decoder;

the first cache to perform a cache lookup based upon the system memory read request;

the address translator/decoder to receive the system memory read request and to prepare a main memory read command independent from performance of the cache lookup of the first cache, wherein the address translator/decoder is to prepare the read command before a miss resulting from the cache lookup of the first cache is reported in response to the cache lookup of the first cache being a miss, the controller to transmit the system memory read request to a second, of a higher level than the first cache; and the second cache to perform a cache lookup based upon the system memory read request; and the controller to return a system memory read request result to a processor from a successful storage mechanism, and to cancel the system memory read request to a storage mechanism after information sought by the system memory read request is located on the successful storage mechanism.

10. The apparatus of claim 9, wherein the main memory read command is canceled if the cache lookup hits and the main memory read command is sent to a main memory if the cache lookup misses.

11. The apparatus of claim 9, wherein the main memory read command is sent to a main memory and canceled if the cache lookup hits.

12. The apparatus of claim 9, further comprising a main memory.

13. The apparatus of claim 9, wherein the main memory is selected from the group consisting of:

a synchronous dynamic random access memory (SDRAM);

a double data rate SDRAM (DDRSDRAM); and a Rambus™ DRAM (RDRAM).

14. The apparatus of claim 9, further comprising a main memory controller, coupled to the address translator/decoder.

15. The apparatus of claim 9, wherein the address translator/decoder is a component of a main memory controller, the main memory controller is coupled to a main memory.

16. The apparatus of claim 9, wherein the address translator/decoder sends the main memory read command to a main memory before the cache lookup is completed.

17. The apparatus of claim 9, further comprising a master cache controller to determine whether a higher level cache is present and to send the system memory read request to a cache controller of the higher level cache, the higher level cache becoming the cache.

* * * * *